United States Patent [19]
Sutton et al.

[11] 3,787,971
[45] Jan. 29, 1974

[54] CARPET TRIM CUTTER

[75] Inventors: Lawrence R. Sutton, Detroit; Carl P. Ranno, Grosse Point; Kenneth E. Hewson, Farmington, all of Mich.

[73] Assignee: Performance Industries, Inc., Pontiac, Mich.

[22] Filed: Oct. 6, 1972

[21] Appl. No.: 298,804

[52] U.S. Cl. ................................................. 30/293
[51] Int. Cl. .............................................. B26b 3/08
[58] Field of Search .............. 30/286, 287, 293, 294

[56] References Cited
UNITED STATES PATENTS
3,363,314  1/1968  O'Brien........................... 30/287 X
3,535,786  10/1970  Sanders.............................. 30/293
3,605,267  9/1971  Brenner................................ 30/293

Primary Examiner—James L. Jones, Jr.
Assistant Examiner—J. C. Peters
Attorney, Agent, or Firm—Andrew R. Basile et al.

[57] ABSTRACT

A carpet trim cutter having a blade holder which is adjustably mountable to the body of the carpet trim cutter such that a cutting blade carried by the blade holder may be selectively positioned to control the depth of cut by the cutting blade. Means are provided for selectively positioning the blade holder on the body of the carpet trim cutter including means for releasably attaching both the blade cutter and the blade to the carpet trim cutter. The carpet trim cutter is of an integral construction fabricated from a plastic material.

7 Claims, 4 Drawing Figures

PATENTED JAN 29 1974
3,787,971
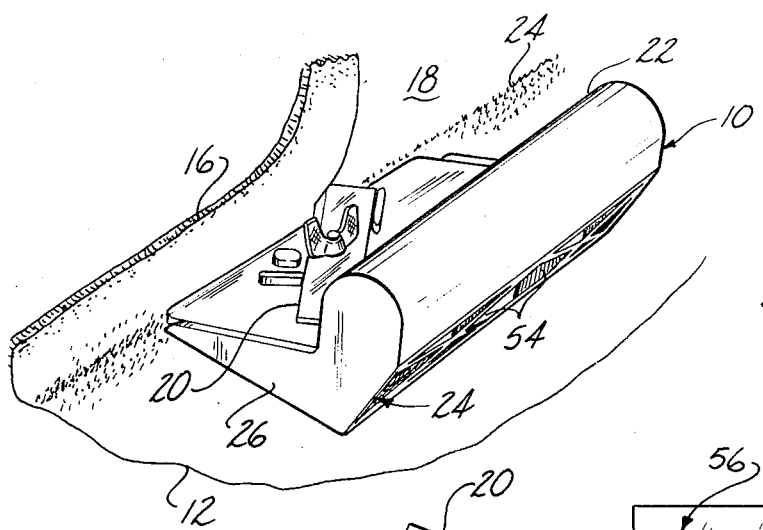
Fig-1
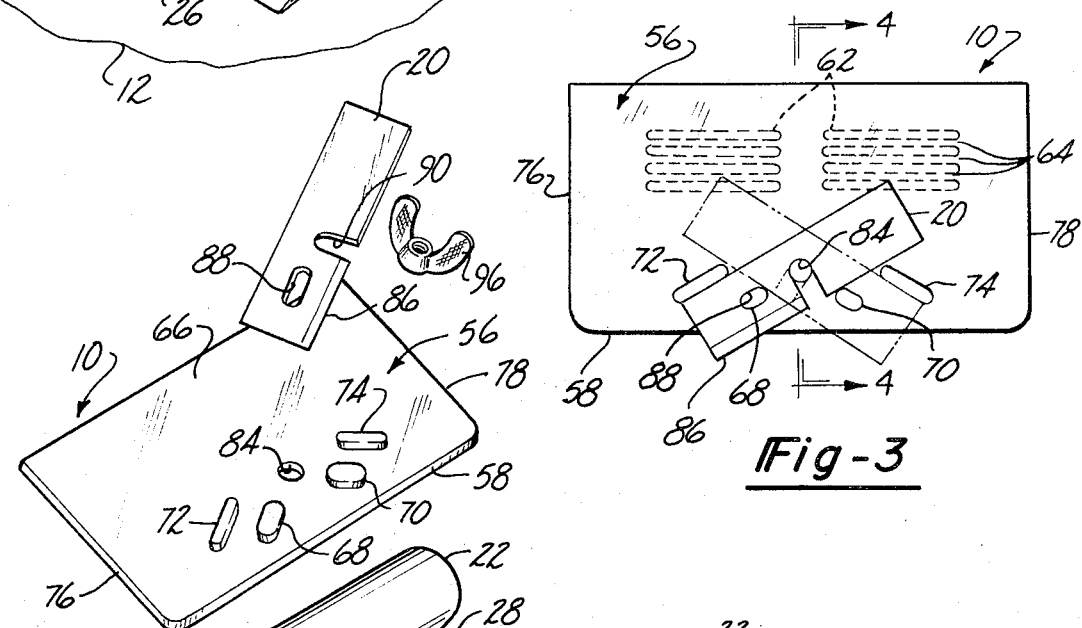
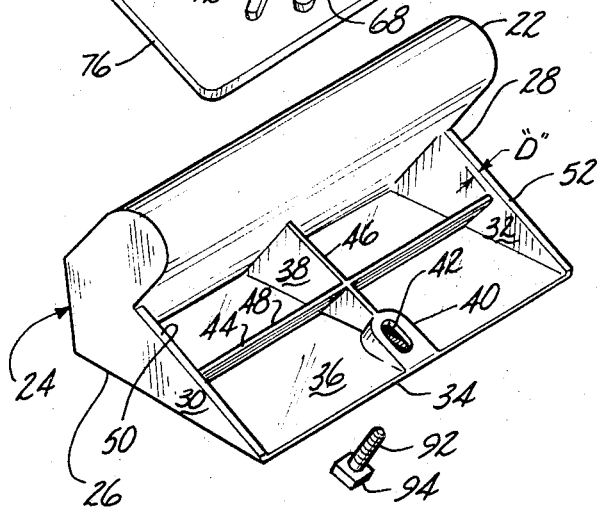
Fig-2
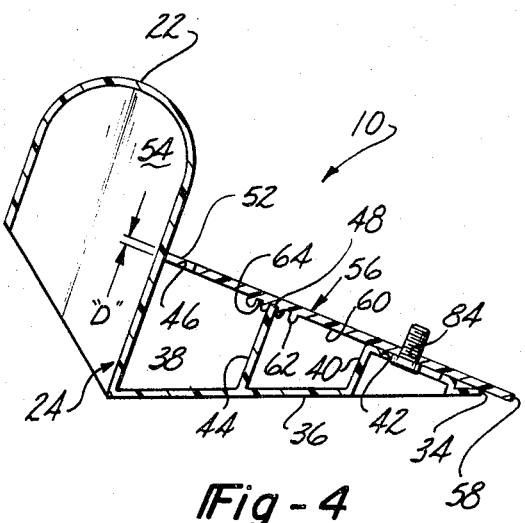
Fig-3
Fig-4

CARPET TRIM CUTTER

BACKGROUND OF THE INVENTION

I. Field of the Invention

The present invention relates to carpet cutting tools and, in particular, to an improved carpet trim cutter having means for adjustably positioning a cutting blade carried thereby.

II. Description of the Prior Art

Heretofore carpet cutting and trimming tools have been disclosed in the prior art, as for example, the carpet cutting and trimming tools disclosed in U.S. Pat. Nos. 3,482,310, 3,395,453, 3,382,579, and 3,581,397. Each of these tools is adapted for trimming the edge of a wall-to-wall carpet when laid on a floor. In installing wall-to-wall carpeting, it is desired that the edges of the carpeting abut, snuggling, against the walls of the room at and immediately adjacent the floor. Since carpeting does not come precut to the exact dimensions of the room and since walls invariably include minor surface irregularities or the room itself may not be of a conventional rectangular shape, it is necessary, in order to provide the desired snug fit between the edges of the carpet and the walls of the room, that during installation the carpet is cut and trimmed along the edges thereof to follow the contour of the walls adjacent the floor. Carpet cutting tools and trimming devices, such as those disclosed in the aforementioned patents, have been employed for this purpose and generally comprise a flat base plate carrying a plate holder assembly and a fixed handle which facilitates the manual movement of the tool along the carpet in order to effect a cutting of the edge thereof adjacent the walls. Although such prior art carpet trimmers and cutting devices have functioned in an acceptable manner, they utilize numerous components, are expensive to manufacture and have a limited useful life.

SUMMARY OF THE INVENTION

The present invention which will be described subsequently in greater detail comprises a carpet trim cutter having a body portion with a pair of outwardly extending wall sections which mount therebetween a blade holder vertically supported by a pair of cross members all of which cooperate with the opposite longitudinal edges and underside of a blade holder to provide a selected positioning thereof with respect to the surface of a carpet adapted to be cut.

It is therefore an object of the present invention to provide a new improved carpet trim cutter which eliminates the numerous components utilized in the aforementioned cutting tools and devices, but one which will perform the cutting operation in a satisfactory manner, is extremely simple in its design and inexpensive in its manufacture.

It is also an object of the present invention to provide a carpet trim cutter which may be moved smoothly along a floor-laid, wall-to-wall carpet and accomplish a clean, easy and correct trim cut of the excess upturned carpet portion disposed on the adjacent walls.

Other objects, advantages and applications of the present invention will become apparent to those skilled in the art of carpet trim cutters and similar devices when the accompanying description of one example of the best mode contemplated for practicing the invention is read in conjunction with the accompanying drawings.

BRIEF DESCRIPTION OF THE DRAWING

The description herein makes reference to the accompanying drawing wherein like reference numerals refer to like parts throughout the several views, and in which:

FIG. 1 is a perspective view of a carpet trim cutter in use for trimming an edge portion of a carpet with the carpet trim cutter being fabricated in accordance with the principles of the present invention;

FIG. 2 is an exploded perspective view of the carpet trim cutter illustrated in FIG. 1;

FIG. 3 is a fragmentary plan view of the carpet trim cutter illustrated in FIGS. 1 and 2; and FIG. 4 is a cross-sectional view of the carpet trim cutter taken along line 4—4 of FIG. 3 with components of the carpet trim cutter being removed for purposes of clarity.

DESCRIPTION OF THE PREFERRED EMBODIMENT

Referring now to the drawing and, in particular, to FIG. 1 wherein there is illustrated one example of the present invention in the form of a carpet trim cutter 10 positioned on the upper surface of a carpet 12 which, in turn, has an edge portion 16 folded upwardly along a wall 18 adjacent the floor upon which the wall-to-wall carpet 12 has been laid. The carpet trim cutter 10 has a cutting blade 20 which, when the carpet installer grasps a handle, section 22 of the carpet trim cutter 10, engages the carpet 12 to effect a cutting of the edge portion 16 such that the resultant carpet edge 24 abuts, snuggling, against the wall 18, all of which will be described in much greater detail hereinafter.

Referring now to both FIGS. 1 and 2, the carpet trim cutter 10 is illustrated as comprising a body 24 having the aforementioned handle section 22 enclosed at its opposite longitudinal ends by end walls 26 and 28 each of which respectively has triangularly-shaped sections 30 and 32 (FIG. 2) that extend laterally of the longitudinal axis of the handle section 22 and which terminate at their apex at the longitudinal edge 34 of a base 36. The base 36, as can best be seen in FIGS. 2 and 4, extends laterally from the bottom portion of the handle section 22 and connects lower inner edges of the sections 30 and 32. The body 24 further comprises an intermediate triangularly-shaped wall 38 having its bottom edge extending along the upper surface of the base 36 with its apex terminating in an enlarged support section 40 which, in turn, has an aperture 42 extending therethrough for a purpose to be described hereinafter. The triangularly-shaped walls 32, 30 and 38 are interconnected by a longitudinally disposed cross member 44 with the upper edge 46 of the wall 38 and the upper edge 48 of the cross member 44 being disposed in the same plane which, in turn, is spaced at a distance D (FIGS. 2 and 4) below the upper edges 50 and 52, respectively of the triangularly-shaped end wall sections 30 and 32.

Although the body 24 of the carpet trim cutter 10 and its aforementioned components may be fabricated from any suitable materials in individual fabricating operations and assembled by any suitable means, in the preferred embodiment the body 24 and the aforementioned components are of an integral construction and preferably fabricated from a molded plastic of a comparable material, such materials being known to those skilled in the art of plastics and the like.

The handle 22 of the body 24, as can best be seen in FIGS. 1 and 4, is provided with a web ribbing portion 54 which adds both strength and rigidity to the handle 22, in particular, and to the body 24 in general.

The carpet trim cutter 10 further comprises a blade holder 56 which is generally rectangular in shape and has a thickness approximately equal to the distance D. The blade holder further includes a longitudinal edge 58 which generally parallels the longitudinal edge 34 of the base 36 when the blade holder 56 is in its assembled position as will be described hereinafter.

The bottom surface 60 of the blade holder 56, as can best be seen in FIGS. 3 and 4, has a plurality of longitudinally disposed and laterally spaced ridges 62 defining thereinbetween a plurality of spaced-apart slots 64. The upper surface 66 of the blade holder 56 has two locating pins 68 and 70 and two stop pins 72 and 74. The pins, as well as the ridges 62, are integral portions of the blade holder 56 which is, similar to the body 24, fabricated from a plastic material or the like. The pins function to properly locate the positioning of the cutting blade 20 as will be described.

In use the cutting blade holder 56 is positioned on the upper edges 46 and 48 of the intermediate wall 38 and cross member 44, respectively, with the opposite longitudinal edges 76 and 78 of the blade holder 56 being in abutment with the inner opposing faces of the side walls of the body 24; which abutment restrains the blade holder 56 from longitudinal movement with respect to the body portion 24. At the same time, the upper edge 48, in addition to supporting the blade holder 56, is engaged selectively within one of the slots 64 formed between the ridges 62 such that the side surfaces of the cross member 44 abuts the adjacent side surfaces of the ridges. In addition to restraining lateral movement of the blade holder 56 with respect to the cross member 44, this arrangement provides a very simple means for selectively locating the longitudinal edge 58 of the blade holder with respect to the longitudinal edge 34 of the base. For example when the cross member 44 engages the slot 64 closest to the longitudinal edge 58 of the blade holder 56, the longitudinal edge 58 is positioned closer to the longitudinal edge 34, that is, toward the handle 22, while positioning of the upper edge 48 into a slot 64 further away from the longitudinal edge 58 results in the longitudinal edge 58 being positioned further outwardly from the longitudinal edge 34, that is, further away from the handle 22. Since the cutting blade is releasably attached to the blade holder 56, a very simple means for adjusting the position of the cutting edge of the blade 20 is provided. Thus the cutting blade can be selectively varied to accommodate the cutting of carpets having different thicknesses.

The stop pins 72 and 74 are located on the upper surface 66 of the blade holder 56 on opposite sides of an aperture 84 which, in turn, is aligned with the aperture 42 therebelow when the blade holder 56 is positioned on top of the cross member 44 as hereinbefore described. The stop pins 70 and 74 which are integrally formed with the blade holder 56 have elongated shapes with their longitudinal axes being disposed in planes that are inclined with respect to one another and to the longitudinal edge 58. The locating pins 68 and 70 are disposed along axes which are respectively parallel to the axes of the stop pin 72 and 74 and which axes intersect each other at the center point of the aperture 34.

The cutting blade 20 (FIG. 2) has a cutting edge 86, an elongated aperture 88 having a longitudinal axis coincident with the longitudinal axis of the cutting blade 20, and a slot 90 located approximately at the midsection of the cutting blade 20.

The cutting blade 20 is so positioned (as can best be seen in FIGS. 1 and 3) that the cutting edge 86 extends outwardly beyond the longitudinal edge 58 of the blade holder 56 while the aperture 88 receives the locating pin 68 and the slot is aligned with the aperture 84. A bolt 92 having a square head 94 extends upwardly through the base 36, through the aperture 42, the aperture 84, and the slot 90 whereupon it threadably engages a wing nut 96. The wing nut 96 facilitates the securing of both the cutting blade 20 and the blade holder 56 to the carpet cutter 10 in a simple manner which permits the easy assembly and disassembly of the cutter 10 to selectively adjust the position of the blade holder 56 with respect to the cross member 44 and thus, the amount of extension of the cutting blade edge 86 outwardly therefrom to control the depth of cut into the carpet 12.

As shown in FIG. 3 in phantom lines, the cutting blade 20 may have its position reversed such that the aperture 88 engages the locating pin 70 while the slot 90 is aligned with the aperture 84 to facilitate the passage of the bolt 92 therethrough and the tightening down of the assembly by means of the wing nut 96. As can best be seen in FIG. 1, the blade when in the position shown facilitates cutting of the carpet when the carpet cutter is moved toward the left. When movement of the carpet cutter towards the right is desired, the blade 20 must be reversed to the position shown in phantom lines in FIG. 3.

As viewed in FIG. 3, the lower edge of the stop pin 72, in addition to guiding and locating the blade 20, functions in conjunction with the lower side edge of the locating pin 68 to restrain the blade 20 from clockwise rotation due to forces exerted thereagainst as the cutting operation takes place. In addition, abutment with the upper edges of the stop pin 74 and/or locating pin 70 further resist rotational movement of the blade 20 and thus the blade 20 is securely located and prevented from rotating from its cutting position. Similarly, when the cutting blade is in the position shown in phantom lines in FIG. 3, the under side of the stop pin 74 cooperates with the locating pin 70 to prevent counterclockwise rotation of the cutting blade 56 while the upper edges of the stop pin 72 and/or locating pin 68 abut the lower side of the cutting blade 20 to further restrain the same from counterclockwise rotation.

It can thus be seen that the present invention has provided a new and improved carpet trim cutter which facilitates the clean, easy and correct trim cut of excess upturned carpet disposed on the adjacent wall of the floor on which wall-to-wall carpeting has been laid.

Although only one form of the present invention has been disclosed, it should be understood by those skilled in the art other forms are to be had all coming within the spirit of the invention and the scope of the appended claims.

What is claimed is as follows:
1. A carpet trim cutter comprising:
   a body;

handle means caried by said body;

first and second spaced-apart laterally extending walls;

a longitudinally disposed third wall positioned between the opposing inner faces of said first and second walls, the upper edge of said third wall terminating below the upper edges of said first and second walls;

a blade holder having on the bottom side thereof a plurality of longitudinally disposed and laterally spaced-apart slots respectively, selectively, engageable with said third wall upper edge when said blade holder is positioned thereon between said first and second walls, said selective engagement controlling the distance at which a longitudinally disposed edge of said blade holder extends beyond said first and second walls; and means for fastening a cutting blade to said blade holder.

2. The carpet trim cutter defined in claim 1 wherein said fastening means for fastening said blade to said holder is adapted to simultaneously fasten said holder to said body.

3. The carpet trim cutter defined in claim 1 wherein the longitudinally opposing edges of said blade holder are respectively in an abutting contact with the opposing inner faces of said first and second walls to restrain said blade holder from longitudinal movement.

4. The carpet trim cutter defined in claim 1 wherein said body, said handle means and said walls are integrally formed.

5. The carpet trim cutter defined in claim 4 wherein said body handle means and walls are fabricated from a plastic material.

6. The carpet trim cutter defined in claim 1 wherein said means for holding said cutting blade comprises a first pair of raised ridges disposed respectively in planes which are inclined with respect to one another and to said extended longitudinal edge of said blade holder and a second pair of spaced-apart raised ridges disposed, respectively, in second planes parallel to said first-mentioned planes and said second planes being inclined with respect to one another and to said longitudinal edge of said blade holder, said blade having an aperture adapted to receive one of said second pair of raised ridges while an edge of said blade is in abutment with at least one of said first ridges, said fastening means extending through said blade to permit a removable attachment of said blade to said blade holder, said blade being removable from said first-mentioned raised ridge and receivable in said other of said second raised ridges wherein a longitudinal edge of said blade is in abutting contact with the other of said first pair of raised ridges with said fastening means selectively attaching said blade to said blade holder.

7. The carpet trim cutter defined in claim 6 wherein said fastening means comprises a nut and bolt arrangement said bolt extending through said body portion, said blade holder and said blade for a threaded engagement with said nut to fasten said blade and said blade holder to said body.

* * * * *